E. DUCHAMP.
Evaporating Pan.
No. 26,574.
Patented Dec. 27, 1859.
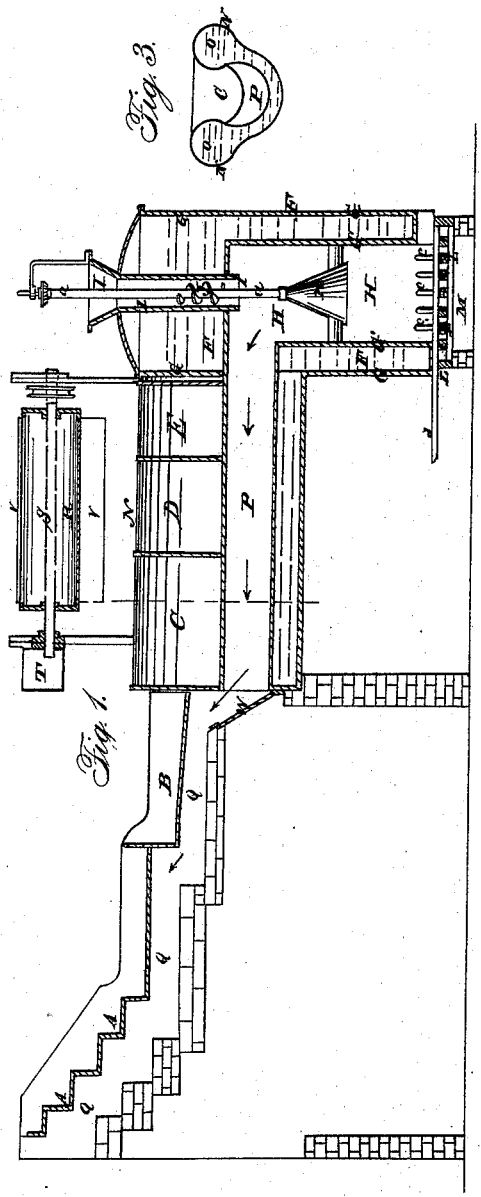
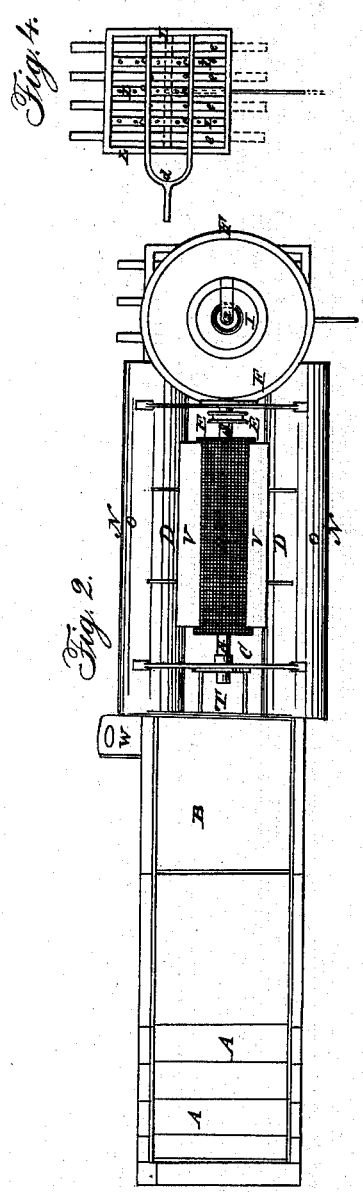
Witnesses:
Inventor:

UNITED STATES PATENT OFFICE.

EUGÈNE DUCHAMP, OF ST. MARTINSVILLE, LOUISIANA.

IMPROVEMENT IN APPARATUS FOR EVAPORATING SUGAR-JUICES.

Specification forming part of Letters Patent No. 26,574, dated December 27, 1859.

*To all whom it may concern:*

Be it known that I, EUGÈNE DUCHAMP, of St. Martinsville, in the parish of St. Martins and State of Louisiana, have invented certain new and useful Improvements in Furnaces for Evaporating Sugar-Juices; and I do hereby declare that the following is a full, clear, and exact description of the same, reference being had to the accompanying drawings, making a part of this specification, in which—

Figure 1 represents a vertical longitudinal section taken from front to rear of the furnace. Fig. 2 is a plan view of the furnace, exhibiting the several parts constituting my invention. Fig. 3 is a cross-section of the pans which are heated by steam. Fig. 4 is a plan view of the gate detached from the boiler, showing the movable grate in two positions.

The nature of my invention and improvements in furnaces for evaporating the juices of sugar-cane consists in arranging in the front end of the furnace a vertical boiler, which shall serve as a steam-boiler to generate steam for the machinery employed in the crushing of the cane, and to construct this vertical boiler so that the cane-trash or bagasse may be fed down through its center and be supplied to the fire in a state fit for combustion, so that the bagasse may be used directly from the crushing-mill as a suitable fuel.

It further consists in combining with the vertical boiler a horizontal concentrating-boiler of a peculiar shape, and surrounded with a water-jacket, the water communicating with and receiving its heat from the vertical boiler, this boiler being divided into separate compartments by suitable partitions.

To enable others skilled in the art to understand and use my invention, I will proceed to describe its construction and operation.

The juice as it comes from the mill is first poured upon the evaporating-stairs A A, and runs down into the pan that is most distant from the fire. It is then gradually passed from one pan to the other as fast as the higher one is filled, until it reaches the pan B, where it arrives to the boiling-point, and is drawn off and passed through suitable filters for separating the solid feculencies, which are held in mechanical suspension in the juice when removed from the pan B. After the juice has passed through the filter, it is pumped into the boiling-pan C, and from thence it is passed to the pan D, and, lastly, in the battery E, where the concentration is completed. Previous to passing the juice to this latter pan E, and in order to more rapidly evaporate the water from the juice, the operation is facilitated by pumping the juice from the pans C D to a rotary sieve or sieves placed above these pans, which will hereinafter be described.

In most of the tropical countries where sugar is made fuel has become scarce; hence the great object of the planter is to have his works arranged so as to economize fuel. One part of my invention is specially adapted to the purpose of economy in fuel, and to employ as such the bagasse or cane-trash directly from the crushing-mill. For this purpose I construct a vertical boiler, F, made of boiler-iron, and serving the twofold purpose of heating the water for the evaporating-pans and for generating steam to be used in driving the machinery used about the works. This boiler F is in many respects made similar to the ordinary vertical steam-boiler, G and G' being the outer and inner shell, and H the fire-chamber; but in the center of this boiler, and opening out at the top, is arranged a funnel, I, in which is rotated a spiral conveyer, J, through which the bagasse is fed to the fire, and below this funnel, and in the center of the fire-chamber, is a cone, K, upon which the bagasse is slowly dropped from the funnel. This cone serves to spread the bagasse evenly upon the fire and to prevent its being all dropped in one place. The spiral conveyer is fixed to a vertical shaft, *a*, having its bearing in the apex of the cone K, and this shaft is rotated by any suitable gearing from the prime mover. The bagasse in passing thus slowly through the funnel I and being separated by the cone K receives from the fire below a sufficient heat to render it fit for combustion when it is deposited upon the grate in the bottom of the boiler; but to further effect the object of employing it as a fuel, and to prevent it from acting as a damper upon the fire, I have constructed a grate which will keep it in a state of agitation while being burned at the same time, so that an artificial draft will be produced to facilitate combustion by supplying the fire with a constant blast. This grate is represented clearly by Figs. 1 and 4, L being an immovable hollow grate, with vertical pins or agitators *c* projecting up from a bifurcated blast-pipe, d, through which the waste or exhaust steam is supplied to the fire. The grate-bars are perforated, so as to disperse the blast under the entire surface of the fire. Between each of these fixed grate-bars are solid bars e e, having also vertical pins proceeding up from each bar. This grate is movable, and is kept in motion by any suitable means. The whole grate is elevated upon masonry, forming the ash-pit M near the top of the vertical boiler F, which is of a semi-cylindrical shape, terminating in enlarged portions O O, which serve as steam-chambers, as represented by Fig. 3. This boiler is surrounded with water, which receives its heat directly from the vertical boiler, and also from the fire in its passage through the flue-space P, the water-line of both boilers being the same. This boiler N is divided into compartments C, D, and E, or as many more as may be found necessary. The juice is changed from one boiler to the other, according to its consistency or degree of concentration, until it reaches the teache or battery E, from which it is finally drawn off into the coolers.

Before passing the juice from one boiler to the other, and in order to facilitate its concentration by evaporation, I have arranged above each boiler, except the teache-boiler E, a cylinder made of fine wire net-work. (Represented by R in Figs. 1 and 2.) This sieve has a hollow and perforated shaft, S, passing longitudinally through it, which serves to support the cylinder, and at the same time to conduct the juice from the receiver T, into which it is pumped from the boilers below to the interior of the cylinder R. This cylinder is then rotated very swiftly, and the juice thrown through the sieve and separated into particles like rain, which return into their respective boilers, the boilers and rotary sieves being inclosed by a suitable chimney, (not shown in the drawings,) which confines the heat around the boilers, and at the same time serves to create a draft for hastening the evaporation; but in order to still further accelerate the evaporation of the juice, I attach to the rotary sieve or cylinder R a suitable number of fans, V', which rotate with the cylinder and cause a rapid evaporation at the same time that the juice is falling from the cylinder in a shower.

I wish it to be distinctly understood that the object of the wire cylinder is not in any way to serve as a filter or strainer, for the juice is freed from the feculencies by a filter before it is put into the boilers. The cylinder serves, therefore, only to facilitate evaporation by dispersion or scattering the juice, so as to thoroughly expose its particles to the heated air.

The flue is represented by P and Q. That lettered Q passes under the defecating-pans A B, which are raised one above the other, so that as fast as one becomes filled the juice is drawn off into the next one below, so that the juice can be kept constantly running from one pan to the other, as fast as it defecates. It undergoes a gradual heating process from the moment it is received upon the stairs of pan A until it arrives to the boiling-point in pan B, when it is immediately passed through the filter or filters and prepared for the boiling operation above described.

W is a fire-guard, which can be removed for cleansing the flue P.

The arrows of Fig. 1 indicate the passage and direction of the currents of hot air.

What I claim as my invention, and desire to secure by Letters Patent, is—

1. The arrangement of a vertical boiler F in front of the furnace, having a funnel, I, spiral conveyer J, and cone K, when the whole are combined for the purpose and in the manner herein set forth.

2. In combination with the above vertical boiler, the semi-cylindrical concentrating-boiler N, when the same is constructed and arranged in the manner and for the purposes herein represented and specified.

EUGÈNE DUCHAMP.

Witnesses:
W. TUSCH,
R. S. SPENCER.